US010906372B2

(12) United States Patent
Shibuya et al.

(10) Patent No.: US 10,906,372 B2
(45) Date of Patent: Feb. 2, 2021

(54) SUSPENSION STRUCTURE FOR IN-WHEEL MOTOR DRIVE DEVICE

(71) Applicant: NTN CORPORATION, Osaka (JP)

(72) Inventors: Yusuke Shibuya, Shizuoka (JP); Shiro Tamura, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/333,669

(22) PCT Filed: Sep. 20, 2017

(86) PCT No.: PCT/JP2017/033813
§ 371 (c)(1),
(2) Date: Mar. 15, 2019

(87) PCT Pub. No.: WO2018/056283
PCT Pub. Date: Mar. 29, 2018

(65) Prior Publication Data
US 2019/0263215 A1 Aug. 29, 2019

(30) Foreign Application Priority Data

Sep. 23, 2016 (JP) .................................. 2016-185455

(51) Int. Cl.
*B60G 21/055* (2006.01)
*B60G 15/07* (2006.01)
*B60K 7/00* (2006.01)
*B60G 7/00* (2006.01)

(52) U.S. Cl.
CPC ........... *B60G 21/0551* (2013.01); *B60G 7/00* (2013.01); *B60G 15/07* (2013.01); *B60G 21/055* (2013.01);
(Continued)

(58) Field of Classification Search
CPC ............. B60G 21/055; B60G 21/0551; B60G 2200/142; B60G 2204/30; B60G 2300/50;
(Continued)

(56) References Cited

U.S. PATENT DOCUMENTS 5,087,229 A 2/1992 Hewko et al.
8,240,688 B2 * 8/2012 Miyamoto ............... F16F 1/377
280/124.107

(Continued)

FOREIGN PATENT DOCUMENTS

CN 103121387 5/2013
DE 10 2010 031 054 1/2012
(Continued)

*Primary Examiner* — Ruth Ilan
(74) *Attorney, Agent, or Firm* — Clark & Brody LP

(57) ABSTRACT

A suspension structure for an in-wheel motor drive device of the present invention includes an in-wheel motor drive device (10), a shock absorber (76), a torsion bar (81), and a stabilizer link (86), wherein: the shock absorber includes an upper spring seat (79a) provided in an upper end region of the shock absorber and a lower spring seat (79b) provided in a lower end region of the shock absorber and forming a pair with the upper spring seat; an upper end (87a) of the stabilizer link is arranged between a vehicle back edge (79d) of the lower spring seat and a vehicle front edge (79c) of the lower spring seat; and a lower end (87b) of the stabilizer link is arranged so as to overlap with a hub wheel (12) as viewed in an axial direction of the hub wheel.

3 Claims, 9 Drawing Sheets

(52) U.S. Cl.
CPC .............. *B60K 7/00* (2013.01); *B60K 7/0007* (2013.01); *B60G 2204/129* (2013.01); *B60G 2204/1224* (2013.01); *B60G 2204/30* (2013.01); *B60G 2300/50* (2013.01); *B60K 2007/0038* (2013.01)

(58) Field of Classification Search
CPC ............ B60G 2204/1224; B60G 15/07; B60G 2204/129; B60K 7/0007; B60K 207/0038; B60K 17/046; B60K 2007/0038
USPC ...................................................... 180/65.51
See application file for complete search history.

(56) References Cited

U.S. PATENT DOCUMENTS 8,579,312 B2 * 11/2013 Koumura ........... B60G 21/0551
280/124.152
8,777,244 B2 * 7/2014 Seethaler ............... B60G 11/06
280/124.145
10,414,264 B2 * 9/2019 Tamura .................... B60K 7/00
10,464,384 B2 * 11/2019 Ishikawa .............. B60K 17/046
10,632,938 B2 * 4/2020 Tamura ............... B60R 16/0207

FOREIGN PATENT DOCUMENTS

| EP | 1953014 A1 * | 8/2008 | ......... B60G 21/0551 |
|---|---|---|---|
| FR | 2606333 | 5/1988 | |
| JP | 2002-247713 | 8/2002 | |
| JP | 2005-306254 | 11/2005 | |
| JP | 2007-106193 | 4/2007 | |
| JP | 2008-239089 | 10/2008 | |
| JP | 2009-202606 | 9/2009 | |
| WO | 2009/115873 | 9/2009 | |

* cited by examiner

VEHICLE WIDTH DIRECTION OUTSIDE

PRIOR ART

PRIOR ART

SUSPENSION STRUCTURE FOR IN-WHEEL MOTOR DRIVE DEVICE

TECHNICAL FIELD

The present invention relates to a suspension structure for attaching an in-wheel motor drive device to a vehicle body side member, and in particular relates to a technique for improving the unsprung motion of a suspension structure and improving the ride comfort performance of a vehicle.

BACKGROUND ART

As a suspension device of a conventional vehicle using an engine as a drive source, for example, one as described in Japanese Unexamined Patent Publication No. 2007-106193 (Patent Literature 1) is known. The MacPherson strut type suspension device of Patent Literature 1 includes a strut, a lower arm, and a stabilizer, and mounts a wheel knuckle under a spring to a vehicle body side member on a spring so as to be capable of steering. Further, the differential gear mounted on the sprung side as viewed from the suspension device of Patent Literature 1 and the wheel knuckle joined to the unsprung side are drivingly coupled via the drive shaft. Then, the output of the vehicle engine is transmitted to the wheel knuckle. Both end portions of the drive shaft of the cited literature 1 are joined with a constant velocity joint swinging following the stroke or steering of the suspension device. Both ends of the stabilizer bar of Patent Literature 1 are formed to be curved as viewed in the vehicle width direction so as to prevent interference with the drive shaft. Further, the stabilizer link of Patent Literature 1 is arranged in the vehicle ahead of the kingpin.

On the other hand, as described in, for example, Japanese Unexamined Patent Application Publication No. 2009-202606 (Patent Literature 2), a technique for driving a wheel with an in-wheel motor instead of a conventional vehicle engine is known. Since the in-wheel motor is arranged in the wheel, unlike the conventional vehicle engine, it is not necessary to mount the drive source on the vehicle body, and it is hence possible to effectively use the internal space of the vehicle body. Also, unlike the conventional art, there is no need to provide a differential gear, a drive shaft, and a constant velocity joint.

CITATION LIST

Patent Literatures

Patent Literature 1: Japanese Unexamined Patent Application Publication No. 2007-106193
Patent Literature 2: Japanese Unexamined Patent Application Publication No. 2009-202606

SUMMARY OF INVENTION

Technical Problem

Incidentally, the in-wheel motor is heavier than the conventional wheel knuckle. For this reason, the vehicle with an in-wheel motor mounted thereto has a problem that the unsprung weight of the suspension device becomes larger and the roll rigidity becomes deteriorated, as compared with the vehicle with a conventional engine mounted thereto.

In addition, since the in-wheel motor has a volume larger than that of a conventional wheel knuckle, it tends to interfere with peripheral members such as the arm, the link, and the stabilizer link of the suspension device when steering, and securing of the steering angle becomes an issue. For example, when arranging the stabilizer link in the vehicle ahead of the axle as in Patent Literature 1, it is necessary to suppress the steering angle of the turning outer wheel so that the in-wheel motor driving the turning outer wheel does not interfere with the stabilizer link, and hence the minimum turning radius of the vehicle becomes large.

In Patent Literature 2, although the length of the lower arm is made variable, the control and the mechanism become complicated, causing a problem of cost increase.

In view of the above circumstances, the present invention is intended to provide a suspension device for an in-wheel motor with a structure capable of sufficiently securing a steering angle and further improving the roll rigidity.

Solution to Problem

To this end, a suspension structure for an in-wheel motor drive device according to the present invention includes: an in-wheel motor drive device having a hub wheel coupled with a wheel and a motor portion for driving the hub wheel; a vertically extendable shock absorber of which an upper end is joined with a vehicle body side member and a lower end is joined with the in-wheel motor drive device; a torsion bar including a twisted portion extending to a vehicle width direction outside from a vehicle width direction center portion and an arm portion further extending in a different direction from an vehicle width direction outside end of the twisted portion to a vehicle front/back direction; and a vertically extending stabilizer link of which an upper end is joined with a lower end region of the shock absorber or the in-wheel motor drive device and a lower end is joined with the arm portion. Then the shock absorber includes an upper spring seat provided in an upper end region of the shock absorber and a lower spring seat provided in a lower end region of the shock absorber and forming a pair with the upper spring seat; the upper end of the stabilizer link is arranged in the vehicle ahead of a vehicle back edge of the lower spring seat and in the vehicle behind of a vehicle front edge of the lower spring seat; and the lower end of the stabilizer link is arranged so as to overlap with the hub wheel as viewed in the axial direction of the hub wheel.

According to the present invention, the provision of the torsion bar and the stabilizer link as a stabilizer mechanism improves the roll rigidity of the electric vehicle in the electric vehicle having in-wheel motor drive device under the spring and having a great unsprung weight. Further, according to the present invention, the upper end of the stabilizer link is arranged in the vehicle ahead of the vehicle rear edge of the lower spring seat and in the vehicle behind of the vehicle front edge of the lower spring seat. Further, according to the present invention, the lower end of the stabilizer link is arranged so as to overlap with the hub wheel of the in-wheel motor drive device as viewed in the axial direction of the hub wheel. According to the present invention, the stabilizer link can be arranged on a more vehicle width direction inside than the shock absorber, not being arranged in the vehicle ahead or behind the shock absorber. This allows the stabilizer link to be arranged as close to the steering axis as possible in a case where the steering axle that intersects with the shock absorber is provided. Further, even if the in-wheel motor drive device and the wheels are steered around the steering axis, they do not interfere with the stabilizer link. According to the present invention, the maximum steering angle can be increased and the turning radius of the electric vehicle can be reduced as compared with the conventional suspension structure for the in-wheel motor drive device. The hub wheel of the in-wheel motor drive device may be a cylindrical body or a solid shaft body.

According to the Ackermann steering geometry, it is necessary to reduce the steering angle of the wheel of the turning outer wheel to less than the turning inner wheel in a maximum steered state. In a preferred embodiment of the present invention, the twisted portion is arranged in the vehicle ahead of the axis of the hub wheel. According to such an embodiment, it is advantageous for avoiding interference between the arm portion and the in-wheel motor drive device. In another embodiment, the twisted portion may be arranged in the vehicle behind of the axis of the hub wheel.

In a preferred embodiment of the present invention, the in-wheel motor drive device includes a motor rotation shaft arranged offset from the axis of the hub wheel towards a vehicle front. According to the embodiment, it is advantageous for avoiding the interference between the arm portion and the motor portion due to the Ackermann steering geometry, even in a case where the motor portion having a large size is arranged offset from the axle. In another embodiment, the axis of the hub wheel and the motor rotating shaft may be arranged coaxially.

In a further preferred embodiment of the present invention, the shock absorber is a strut, and a lower arm that is arranged further downward than the strut, extends in the vehicle width direction, and of which the vehicle width direction outside end is rotatably joined with the in-wheel motor drive device and the vehicle width direction inside ends are rotatably joined to a vehicle body side member is further included. According to the embodiment, in the strut type suspension device, the roll rigidity of the electric vehicle can be improved and the maximum steering angle can be increased. In another embodiment, the suspension structure of the present invention can be applied to other types of suspension device.

In one embodiment of the present invention, the in-wheel motor drive device, the shock absorber, and the stabilizer link are arranged on the both vehicle width direction sides and form pairs, respectively, and the torsion bar is joined with the stabilizer link on the vehicle width direction left side at one end and joined with the stabilizer link on the vehicle width direction right side at the other end. According to this embodiment, uneven strokes of a pair of right and left suspension devices are suppressed by one torsion bar, and while ensuring the roll rigidity of the electric vehicle, the maximum steering angle of the in-wheel motor drive device can be increased. In another embodiment, torsion bars of separate members may be provided on the both vehicle width direction right and left sides.

Advantageous Effects of Invention

As described above, according to the present invention, the maximum steering angle of the in-wheel motor drive device can be made larger than the conventional one while securing the roll rigidity of the electric vehicle.

DESCRIPTION OF EMBODIMENTS

Figure 1:
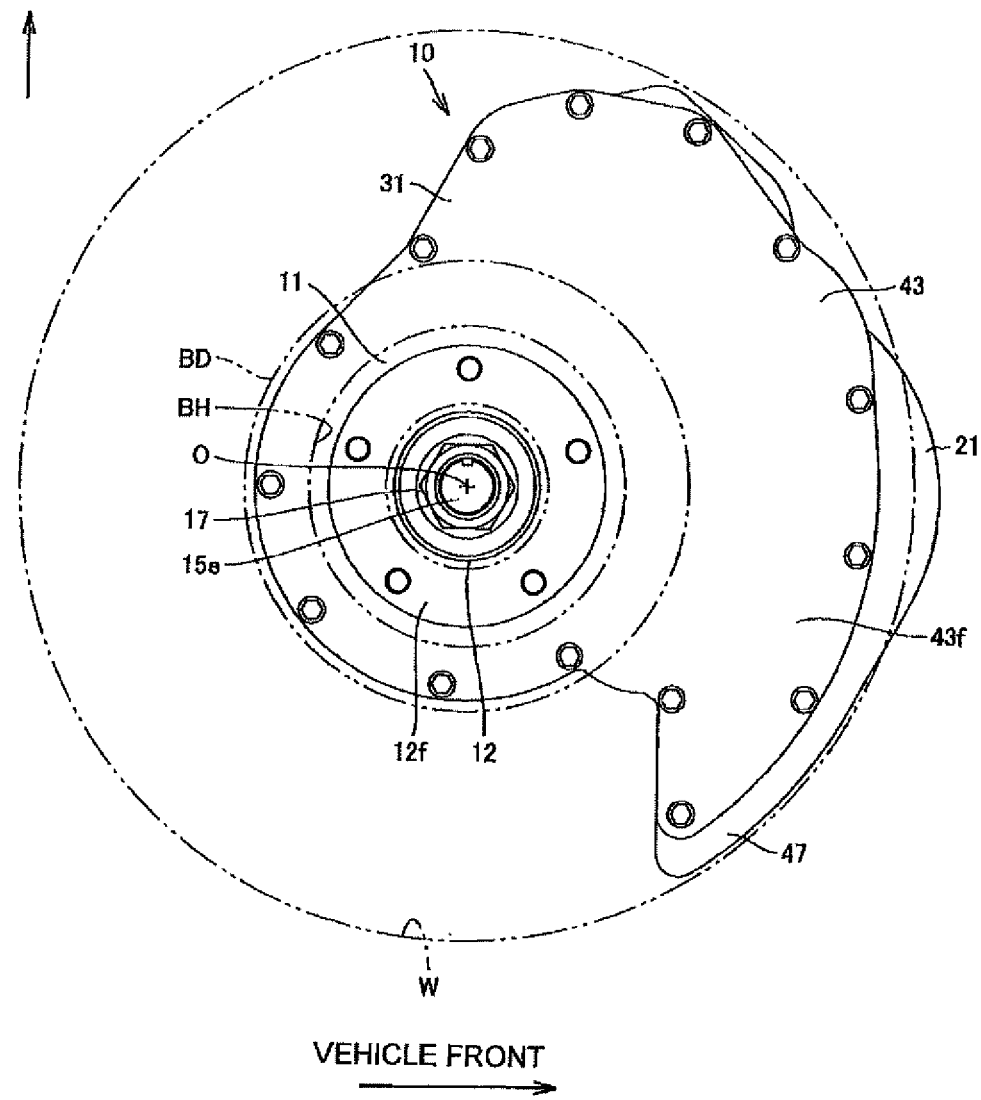
FIG. 1 is a front view showing an in-wheel motor drive device taken out from a suspension structure according to an embodiment of the present invention, and showing a state viewed from a vehicle width direction outside.
Figure 2:
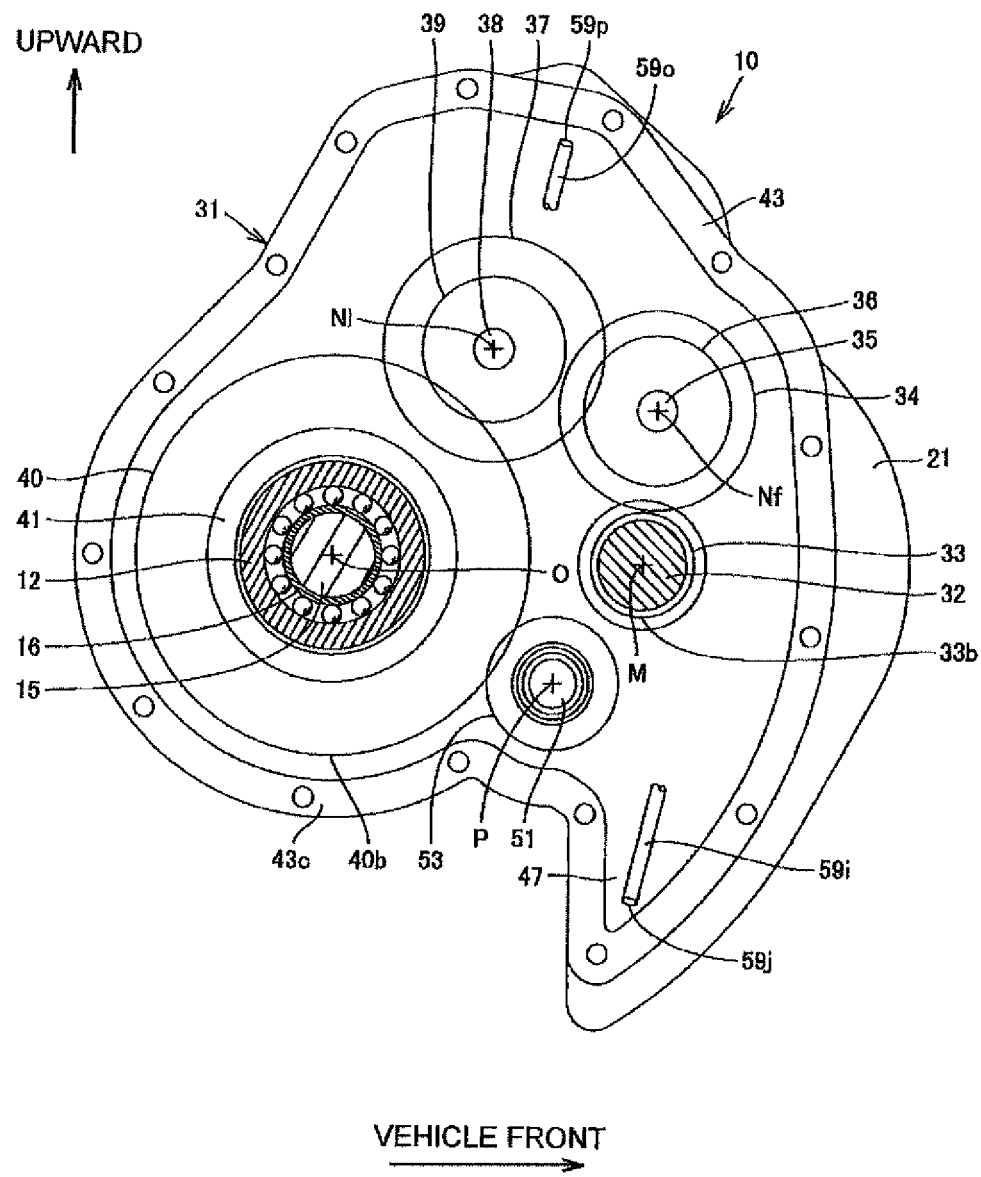
FIG. 2 is a transverse sectional view schematically showing the in-wheel motor drive device of FIG. 1.
Figure 3:
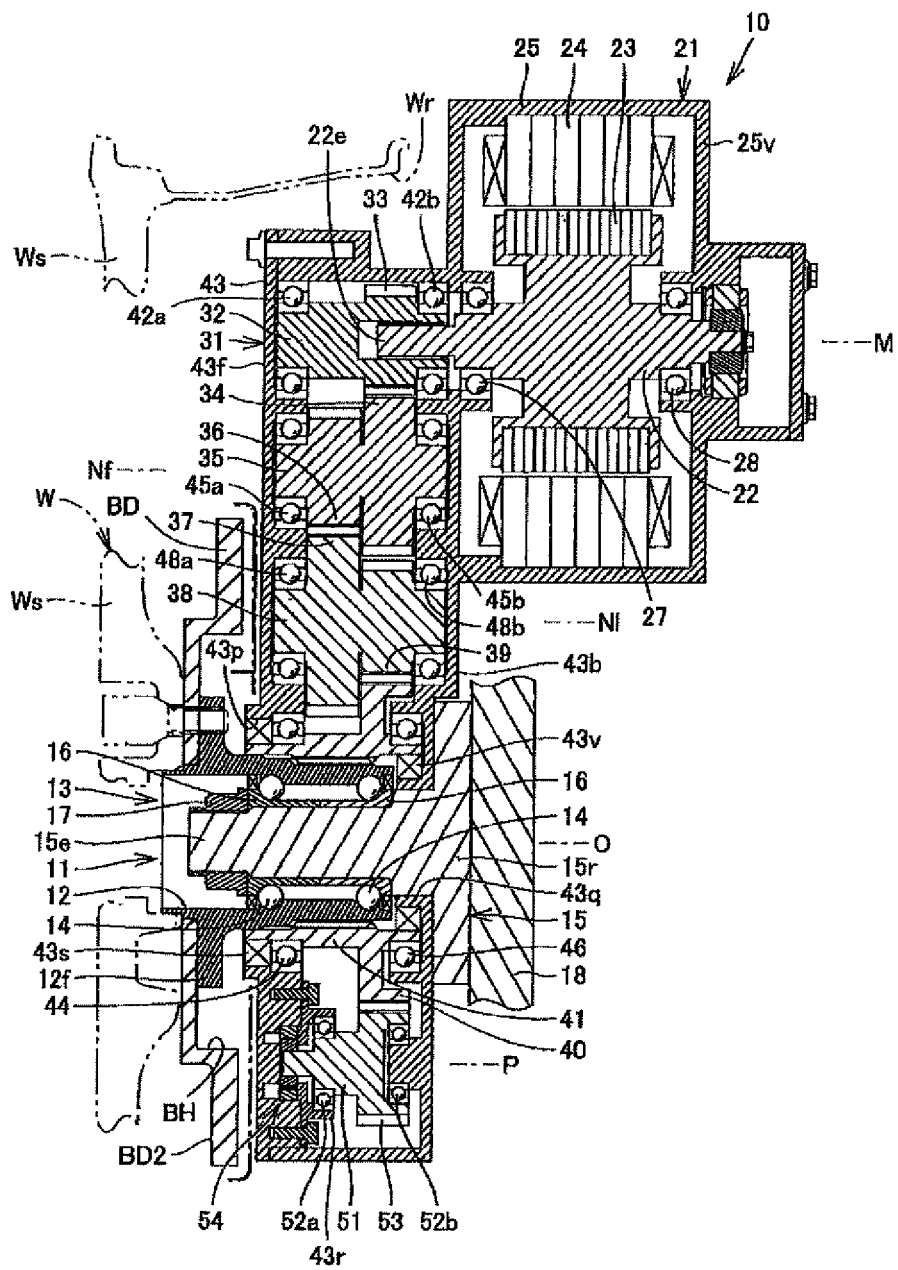
FIG. 3 is an expanded sectional view schematically showing the in-wheel motor drive device of FIG. 1.

An embodiment of the present invention will be described below in detail with reference to the drawings. Prior to the suspension structure according to one embodiment of the present invention, the in-wheel motor drive device will be described. FIG. 1 is a front view showing an in-wheel motor drive device taken out from a suspension structure according to an embodiment of the present invention. FIG. 2 is a transverse sectional view schematically showing this in-wheel motor drive device. FIG. 1 and FIG. 2 show a state viewed from the vehicle width direction outside. In FIG. 2, each gear inside of a speed reduction portion is represented by an addendum circle and illustration of each tooth is omitted. FIG. 3 is an expanded sectional view schematically showing this in-wheel motor drive device. The cut section shown by FIG. 3 is an expanded plane in which a plane including an axis M and an axis Nf shown in FIG. 2, a plane including the axis Nf and an axis Nl, a plane including the Nl and an axis O, and a plane including the axis O and an axis P are connected in this order.

An in-wheel motor drive device 10 includes a wheel hub bearing portion 11, a motor portion 21, and a speed reduction portion 31 that decelerates the rotation of the motor portion 21 and transmits the reduced rotation to the wheel hub bearing portion 11, and is arranged on the both vehicle width direction right and left sides of an electric vehicle (not shown). At this time, as shown in FIG. 3, the wheel hub bearing portion 11 is arranged on the vehicle width direction outside, and the motor portion 21 is arranged on the vehicle width direction inside.

The in-wheel motor drive device 10 is arranged in an inner space region of a road wheel W represented by an imaginary line in FIG. 1 and is joined with a center of the road wheel W represented by an imaginary line in FIG. 3, thereby driving the road wheel W of the wheel.

Each in-wheel motor drive device 10 is joined with the vehicle body of the electric vehicle via a suspension device which will be described later. The in-wheel motor drive device 10 is capable of causing an electric vehicle to run at a speed of 0 to 180 km/h on a public road.

As shown in FIG. 1 and FIG. 2, the motor portion 21 and the speed reduction portion 31 are not arranged coaxially with the axis O of the wheel hub bearing portion 11, but are arranged offset in a direction perpendicular from the axis O of the wheel hub bearing portion 11 as shown in FIG. 3. In the present embodiment, the motor portion 21 is arranged in the vehicle ahead of the axis O that is the axle. That is, the in-wheel motor drive device 10, as will be described in detail later, includes a portion arranged forward of the vehicle, a portion arranged rearward of the vehicle, a portion arranged upward, and a portion arranged downward.

As shown in FIG. 3, the wheel hub bearing portion 11 includes an outer ring 12 as a hub wheel coupled with the road wheel W, an inner fixing member 13 passed through a center hole of the outer ring 12, and a plurality of rolling elements 14 arranged in an annular gap between the outer ring 12 and the inner fixing member 13, and thus constituting an axle. The inner fixing member 13 includes a non-rotating fixed shaft 15, a pair of inner races 16, a retaining nut 17, and a hub carrier 18. A root portion 15r of the fixed shaft 15 is formed to have a larger diameter than an end portion 15e. The inner race 16 is fitted to the outer circumference of the fixed shaft 15 between the root portion 15r and the end portion 15e. The retaining nut 17 is threadedly engaged with the end portion 15e of the fixed shaft 15 to fix the inner race 16 between the retaining nut 17 and the root portion 15r.

The fixed shaft 15 extends along the axis O and passes through a main body casing 43 forming an outline of the speed reduction portion 31. Most of the fixed shaft 15 excluding the root portion 15r passes through an opening 43q formed in a back surface portion 43b of the main body casing 43 and is housed inside the main body casing 43. The end portion 15e of the fixed shaft 15 further passes through an opening 43p formed in a front surface portion 43f of the main body casing 43 and protrudes to a more vehicle width direction outside than the front surface portion 43f. The root portion 15r of the fixed shaft 15 is not housed inside the main body casing 43 but arranged on a more vehicle width direction inside than the back surface portion 43b of the main body casing 43 and is joined and fixed to the surface of the back surface portion 43b with a joint means (e.g., bolt) not illustrated. It is to be noted that the front surface portion 43f and the back surface portion 43b are casing wall portions facing each other spaced in the axis O direction. The hub carrier 18 is attached and fixed to the root portion 15r with a joint means not illustrated. The hub carrier 18 is joined with a suspension device and a tie rod described later outside the main body casing 43.

The rolling elements 14 are arranged in double rows separated in the axis O direction. The outer circumferential surface of the inner races 16 of one side of the axis O direction constitutes an inner raceway surface of the rolling elements 14 of the first row and faces the inner circumferential surface of one side of the axis O direction of the outer ring 12. The outer circumferential surface of the inner races 16 of the other side of the axis O direction constitutes an inner raceway surface of the rolling elements 14 of the second row and faces the inner circumferential surface of the other side of the axis O direction of the outer ring 12. In the following description, the vehicle width direction outside (outboard side) is also referred to as one side of the axis O direction and the vehicle width direction inside (inboard side) is also referred to as the other side of the axis O direction. The right/left direction of the page of FIG. 3 corresponds to the vehicle width direction. The inner circumferential surface of the outer ring 12 constitutes an outer raceway surface on which the rolling elements 14 roll. A sealing material is provided between the inner race 16 of one side of the axis O direction and the outer ring 12. A sealing material is provided also between the inner race 16 of the other side of the axis O direction and the outer ring 12. By these sealing members, the outer circumferential surface (inner raceway surface) of the inner race 16 and the inner circumferential surface (outer raceway surface) of the outer ring 12 constitute a closed space.

A flange portion 12f is formed at one end of the axis O direction of the outer ring 12. The flange portion 12f constitutes a coupling seat portion for coupling coaxially with a brake disc BD and a spoke portion Ws of the road wheel W. The outer ring 12 is coupled with the brake disc BD and the road wheel W at the flange portion 12f and rotates integrally with the road wheel W. As an example of variation not illustrated, the flange portion 12f may be a protruding portion that protrudes towards the outer diameter side spaced in the circumferential direction.

The brake disc BD has a hat shape having a flange-shaped frictional surface over the entire circumference, and forms a space inside the hat. The inner circumferential wall surface of the hat internal space is indicated by a hat circle BH.

As shown in FIG. 3, the motor portion 21 includes a motor rotation shaft 22, a rotor 23, a stator 24, and a motor casing 25, which are sequentially arranged from the axis M of the motor portion 21 to the outer diameter side in this order. While the motor portion 21 is a radial gap motor of an inner rotor and an outer stator type, it may be of another type. For example, though not illustrated, the motor portion 21 may be an axial gap motor.

The axis M that becomes a rotation center of the motor rotation shaft 22 and the rotor 23 extends in parallel to the axis O of the wheel hub bearing portion 11. That is, the motor portion 21 is arranged so as to be offset away from the axis O of the wheel hub bearing portion 11. Most axial direction position of the motor portion 21 excluding the end portion of the motor rotation shaft 22 does not overlap with the axis O direction position of the inner fixing member 13 as shown in FIG. 3. The motor casing 25 has a substantially cylindrical shape, and is coupled with the back surface portion 43b of the main body casing 43 at one end in the axis M direction and sealed with a disc-shaped motor casing cover 25v at the other end in the axis M direction. Both end portions of the motor rotation shaft 22 are rotatably supported by the motor casing 25 via rolling bearings 27 and 28. The motor portion 21 drives the outer ring 12.

The speed reduction portion 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main body casing 43. The input shaft 32 is a tubular body having a larger diameter than the end portion 22e of the motor rotation shaft 22 and extends along the axis M of the motor portion 21. The end portion 22e is received in the center hole of the other end portion of the axis M direction of the input shaft 32, and the input shaft 32 is coupled coaxially with the motor rotation shaft 22. Both ends of the input shaft 32 are supported by the main body casing 43 via rolling bearings 42a and 42b. More specifically, one end of the axis M direction of the input shaft 32 is supported by the front surface portion 43f via the rolling bearing 42a, and the other end of the axis M direction of the input shaft 32 is supported by the back surface portion 43b via the rolling bearing 42b. The input gear 33 is an externally toothed gear having a diameter smaller than the motor portion 21, and is coupled coaxially with the input shaft 32. More specifically, the input gear 33 is integrally formed on the outer circumference of the center portion of the axis M direction of the input shaft 32.

The output shaft 41 is a tubular body having a larger diameter than the outer ring 12 and extends along the axis O of the wheel hub bearing portion 11. The other end of the axis O direction of the outer ring 12 is received in the center hole at one end of the axis O direction of the output shaft 41 and the output shaft 41 is coupled coaxially with the outer ring 12. Specifically, a spline groove is formed on the inner circumferential surface of the output shaft 41, a spline groove is formed on the outer circumferential surface of the other end of the axis O direction of the outer ring 12, and these spline grooves are spline-fitted. Such spline fitting realizes torque transmission between the output shaft 41 and the outer ring 12 and allows relative movement therebetween.

Both ends of the output shaft 41 are supported by the main body casing 43 via rolling bearings 44 and 46. Specifically, one end of the axis O direction of the output shaft 41 is supported by the front surface portion 43f via the rolling bearing 44. The other end of the axis O direction of the output shaft 41 is supported by the back surface portion 43b via the rolling bearing 46. The output gear 40 is an externally toothed gear, and is coupled coaxially with the output shaft 41. More specifically, the output gear 40 is integrally formed on the outer circumference of the other end of the axis O direction of the output shaft 41. The inner circumferential surface of the other end of the axis O direction of the output shaft 41 faces the outer circumferential surface of a circumferential wall formed on the back surface portion 43b and surrounding the opening 43q. A sealing material 43v is provided between these circumferential surfaces facing each other.

The two intermediate shafts 35 and 38 extend in parallel to the input shaft 32 and the output shaft 41. That is, the speed reduction portion 31 is a four-axis parallel shaft gear reducer, and the axis O of the output shaft 41, the axis Nf of the intermediate shaft 35, the axis Nl of the intermediate shaft 38, and the axis M of the input shaft 32 extend in parallel to each other, in other words, extend in the vehicle width direction.

The vehicle front/back position of each axis will now be described. As shown in FIG. 2, the axis M of the input shaft 32 is arranged in the vehicle ahead of the axis O of the output shaft 41. Further, the axis Nf of the intermediate shaft 35 is arranged in the vehicle ahead of the axis M of the input shaft 32. The axis Nl of the intermediate shaft 38 is arranged in the vehicle ahead of the axis O of the output shaft 41 and behind of the axis M of the input shaft 32. As an example of variation not illustrated, the axis M of the input shaft 32 is arranged at an arbitrary position around the axis O, and the input shaft 32, the intermediate shaft 35, the intermediate shaft 38, and the output shaft 41 may be arranged in the vehicle front/back direction in this order. In this case, the vertical position of each axis is determined by the front/back position and the vertical position of the motor portion 21. Each of the shafts 32, 35, 38, and 41 constitutes a transmission order of the driving force in this order.

The vertical position of each axis will now be described. The axis M of the input shaft 32 and the axis O of the output shaft 41 are arranged at substantially the same vertical position. The axis Nf of the intermediate shaft 35 is arranged further upward than the axis M of the input shaft 32. The axis Nl of the intermediate shaft 38 is arranged further upward than the axis Nf of the intermediate shaft 35. It is to be noted that it is sufficient for the plurality of intermediate shafts 35 and 38 to be arranged further upward than the input shaft 32 and the output shaft 41, and the intermediate shaft 35 may be arranged further upward than the intermediate shaft 38 as an example of variation not illustrated. Alternatively, as an example of variation not illustrated, the output shaft 41 may be arranged further upward than the input shaft 32. In the example of variation in which the axis M of the input shaft 32 is arranged at the above-described arbitrary position around the axis O, the vertical positions of the input shaft 32, the intermediate shaft 35, the intermediate shaft 38, and the output shaft 41 are determined by the front/back position and the vertical position of the motor.

The intermediate gear 34 and the intermediate gear 36 are externally toothed gears and are coupled coaxially with the center portion of the axis Nf direction of the intermediate shaft 35 as shown in FIG. 3. Both end portions of the intermediate shaft 35 are supported by the main body casing 43 via rolling bearings 45a and 45b. More specifically, one end of the axis Nf direction of the intermediate shaft 35 is supported by the front surface portion 43f via the rolling bearing 45a, and the other end of the axis Nf direction of the intermediate shaft 35 is supported by the back surface portion 43b via the rolling bearing 45b. The intermediate gear 37 and the intermediate gear 39 are externally toothed gears and are coupled coaxially with the center portion of the axis Nl direction of the intermediate shaft 38. Both end portions of the intermediate shaft 38 are supported by the main body casing 43 via rolling bearings 48a and 48b. More specifically, one end of the axis Nl direction of the intermediate shaft 38 is supported by the front surface portion 43f via the rolling bearing 48a, and the other end of the axis Nl direction of the intermediate shaft 38 is supported by the back surface portion 43b via the rolling bearing 48b.

The main body casing 43 forms an outline of the speed reduction portion 31 and the wheel hub bearing portion 11, is formed in a tubular shape, and surrounds the axes O, Nf, Nl, and M that extend in parallel to each other as shown in FIG. 2. Also, the main body casing 43 is housed in the inner space region of the road wheel W (FIG. 1). As shown in FIG. 3, the inner space region of the road wheel W is partitioned by an inner circumferential surface of a rim portion Wr and a spoke portion Ws coupled with one end of the axis O direction of the rim portion Wr. One axial region of the motor portion 21, the wheel hub bearing portion 11, and the speed reduction portion 31 are housed in the inner space region of the road wheel W. The other axial region of the motor portion 21 protrudes to the other axial direction from the road wheel W. Thus, the road wheel W houses most of the in-wheel motor drive device 10.

With reference to FIG. 2, the main body casing 43 protrudes downward in a position spaced apart in the vehicle front/back direction from the axis O of the output gear 40, more specifically, immediately below the axis M of the input gear 33. This protruding portion forms an oil tank 47. On the other hand, a space is secured between a portion 43c immediately below the axis O of the main body casing 43 and a lower portion of the rim portion Wr (FIG. 3). A suspension member (described later) extending in the vehicle width direction is arranged in the space, and the vehicle width direction outside end of the suspension member and the hub carrier 18 (FIG. 3) are freely joined via a ball joint (not illustrated).

The tubular main body casing 43, as shown in FIG. 3, houses the input shaft 32, the input gear 33, the intermediate gear 34, the intermediate shaft 35, the intermediate gear 36, the intermediate gear 37, the intermediate shaft 38, the intermediate gear 39, the output gear 40, and the output shaft 41, and covers the other end of the axis O direction of the wheel hub bearing portion 11. Lubricating oil is sealed inside the main body casing 43. The input gear 33, the intermediate gear 34, the intermediate gear 36, the intermediate gear 37, the intermediate gear 39, and the output gear 40 are helical gears.

As shown in FIG. 3, the main body casing 43 includes the substantially flat front surface portion 43f covering one side of the axial direction of the tubular portion of the speed reduction portion 31 and the substantially flat back surface portion 43b covering the other side of the axial direction of the tubular portion of the speed reduction portion 31. The back surface portion 43b is coupled with the motor casing 25. Further, the back surface portion 43b is coupled with the suspension member (described later) such as an arm and a strut via the root portion 15r and the hub carrier 18. As a result, the in-wheel motor drive device 10 is joined to the suspension device described later. Since the main body casing 43, the motor casing 25, and the motor casing cover 25v are joined to the suspension device via the hub carrier 18, the main body casing 43, the motor casing 25, and the motor casing cover 25v are separated from the suspension device and it is allowed to bound and rebound in the vertical direction and steer about the steering axis extending in the vertical direction.

The opening 43p through which the outer ring 12 passes is formed in the front surface portion 43f.

The opening 43p is provided with a sealing material 43s for sealing the annular gap with the outer ring 12. Therefore, the outer ring 12 to be a rotating body is housed in the main body casing 43 which becomes a non-rotating body except for one end portion of the axis O direction.

The small-diameter input gear 33 and the large-diameter intermediate gear 34 are arranged on one side (on the flange portion 12f side) in the axial direction of the speed reduction portion 31 and engage with each other. The small-diameter intermediate gear 36 and the large-diameter intermediate gear 37 are arranged on the other side (on the motor portion 21 side) in the axial direction of the speed reduction portion 31 and engage with each other. The small-diameter input gear 39 and the large-diameter intermediate gear 40 are arranged on one side (on the flange portion 12f side) in the axial direction of the speed reduction portion 31 and engage with each other. In this way, the input gear 33, the plurality of intermediate gears 34, 36, 37, and 39 and the output gear 40 engage with each other and constitute a drive transmission path leading from the input gear 33 to the output gear 40 via the plurality of intermediate gears 34, 36, 37, and 39. By the engagement of the drive side small-diameter gears and the driven side large-diameter gears, the rotation of the input shaft 32 is decelerated by the intermediate shaft 35, the rotation of the intermediate shaft 35 is decelerated by the intermediate shaft 38, and the rotation of the intermediate shaft 38 is decelerated by the output shaft 41. As a result, the speed reduction portion 31 secures a sufficient reduction ratio. Among the plurality of intermediate gears, the intermediate gear 34 becomes the first intermediate gear located on the input side of the drive transmission path. Among the plurality of intermediate gears, the intermediate gear 39 becomes the final intermediate gear located on the output side of the drive transmission path.

According to the present embodiment, as shown in FIG. 2, the output shaft 41, the intermediate shaft 38, and the input shaft 32 are arranged in this order spaced in the vehicle front/back direction. Further, the intermediate shaft 35 and the intermediate shaft 38 are arranged further upward than the input shaft 32 and the output shaft 41. According to this embodiment, it is possible to arrange the intermediate shaft above the outer ring 12 to be a wheel hub, to secure a space for arranging the oil tank 47 below the outer ring 12, and to secure a space immediately under the outer ring 12. Therefore, it is possible to provide the steering axis extending in the vertical direction that intersects in a space immediately under the outer ring 12, so that the road wheel W and the in-wheel motor drive device 10 can suitably be steered around the steering axis.

According to the present embodiment, as shown in FIG. 2, the axis M of the motor portion 21 is arranged offset in the vehicle front/back direction from the axis O of the wheel hub bearing portion, the axis Nf of the intermediate shaft 35 is arranged upwardly offset from the axis O of the wheel hub bearing portion, and the axis Nl of the intermediate shaft 38 is arranged upwardly offset from the axis O of the wheel hub bearing portion. Thereby, a space can be secured between the portion 43c immediately under the axis O in the in-wheel motor drive device 10 and the lower portion of the road wheel W. Then, the steering axis of the wheel can be arranged so as to intersect to the road wheel W, and the turning characteristic of the wheel is improved.

Further, according to the present embodiment, as shown in FIG. 3, the input shaft 32 and the output shaft 41 extend in the vehicle width direction, and as shown in FIG. 2, the input gear 33 and the output gear 40 are set in an upright attitude in the vertical direction. A lower edge 40b of the output gear 40 is arranged further downward than a lower edge 33b of the input gear 33. As a result, the input gear 33 rotating at a high speed does not immerse in the lubricating oil stored in the lower part of the speed reduction portion 31 inside the main body casing 43, and the stirring resistance of the input gear 33 can be avoided.

Further, according to the present embodiment, as shown in FIG. 2, the plurality of intermediate shafts 35 and 38 include the first intermediate shaft 35, which is arranged above and next to the input shaft 32 and to which driving torque is supplied from the input shaft 32, and the final intermediate shaft 38, which is arranged above and next to the output shaft 41 and from which driving torque is supplied to the output shaft 41. The input shaft 32, the first intermediate shaft 35, the final intermediate shaft 38, and the output shaft 41 are arranged so that a reference line that serially connects the center (the axis M) of the input shaft, the center (the axis Nf) of the first intermediate shaft 35, the center (the axis Nl) of the final intermediate shaft 38, and the center (the axis O) of the output shaft 41 draws an inverted U shape, as viewed in the axial direction of the plurality of intermediate shafts 35 and 38. As a result, the overall arrangement of the plurality of shafts and gears constituting the drive transmission path is downsized so that the plurality of shafts and gears can be housed inside the road wheel W.

Further, according to the present embodiment, as shown in FIG. 3, the outer ring 12 to be a wheel hub is a tubular body, and the wheel hub bearing portion 11 further includes the fixed shaft 15, which is arranged in the center hole of the outer ring 12 and rotatably supports the outer ring 12. Due to this, the output gear 40 can be coupled coaxially to the outer diameter side of the outer ring 12. Then, it is possible to transmit the driving force from the intermediate shaft 38 arranged offset from the outer ring 12 to the outer ring 12.

As shown in FIG. 3, the main body casing 43 further houses a pump shaft 51, rolling bearings 52a and 52b, a pump gear 53, and an oil pump 54. An axis P of the pump shaft 51 extends in parallel with the axis O of the output shaft 41. Further, the pump shaft 51 is arranged away in the vehicle front/back direction from the output shaft 41 and is supported by the main body casing 43 via the rolling bearings 52a and 52b on both sides of the axis P direction. More specifically, one end of the axis P direction of the pump shaft 51 is supported by a cylindrical member 43r attached to the front surface portion 43f via the rolling bearing 52a, and the other end of the axis P direction of the pump shaft 51 is supported by the back surface portion 43*b* via the rolling bearing 52*b*. The other end of the axis P direction of the pump shaft 51 is coupled coaxially with the pump gear 53. The pump gear 53 is an externally toothed gear formed on the more outer diameter side than the rolling bearing 52*b*, is a helical gear, and is driven by the output gear 40 in engagement with the output gear 40.

The oil pump 54 is arranged in the axis P direction further than the rolling bearing 52*a* and is provided at one end of the axis P direction of the pump shaft 51. The oil pump 54 is connected to a suction oil passage 59*i* and a discharge oil passage 59*o* shown in FIG. 2 (connection portion not shown). The suction oil passage 59*i* extends downward from the oil pump 54 and reaches the oil tank 47, and a suction port 59*j* at the lower end of the suction oil passage 59*i* is arranged near the bottom wall of the oil tank 47. The discharge oil passage 59*o* extends upward from the oil pump 54, and a discharge port 59*p* at the upper end of the discharge oil passage 59*o* is arranged at a position higher than the intermediate gear 37.

As the oil pump 54 is driven by the output gear 40, the oil pump 54 sucks the lubricating oil of the oil tank 47 through the suction port 59*j*, and discharges the sucked lubricating oil through the discharge port 59*p*. The discharge port 59*p* is located higher than all the gears (the input gear 33, the intermediate gears 34, 36, 37, and 39, and the output gear 40), and supplies lubricating oil to these gears from above. Further, the lubricating oil is injected from the oil pump 54 into the inside of the motor portion 21. As a result, the motor portion 21 and the speed reduction portion 31 are lubricated and cooled.

Next, the suspension device joined to the in-wheel motor drive device 10 will be described.

Figure 4:
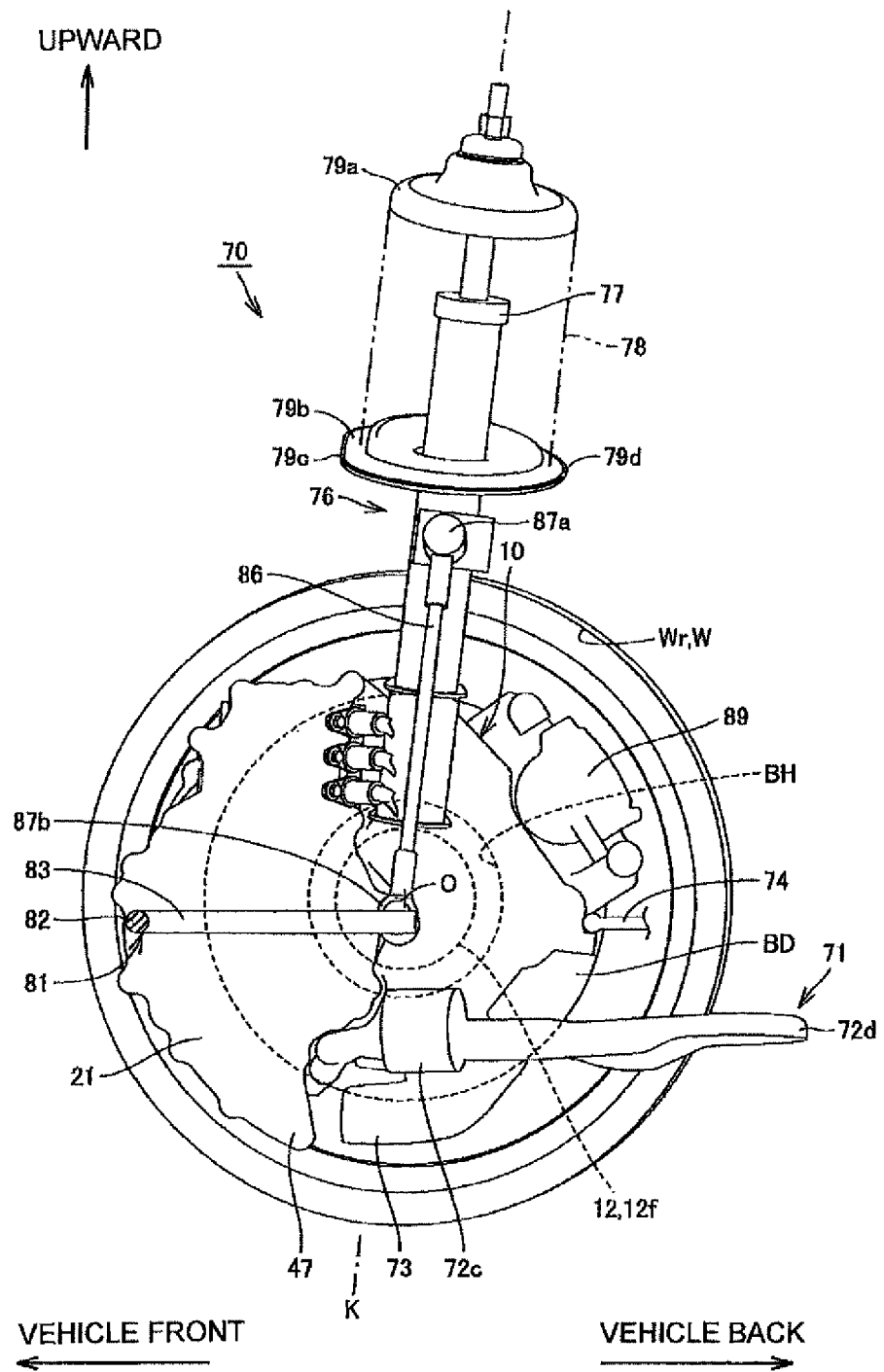
FIG. 4 is a rear view showing the suspension structure of the same embodiment and showing a state viewed from a vehicle width direction inside.
Figure 5:
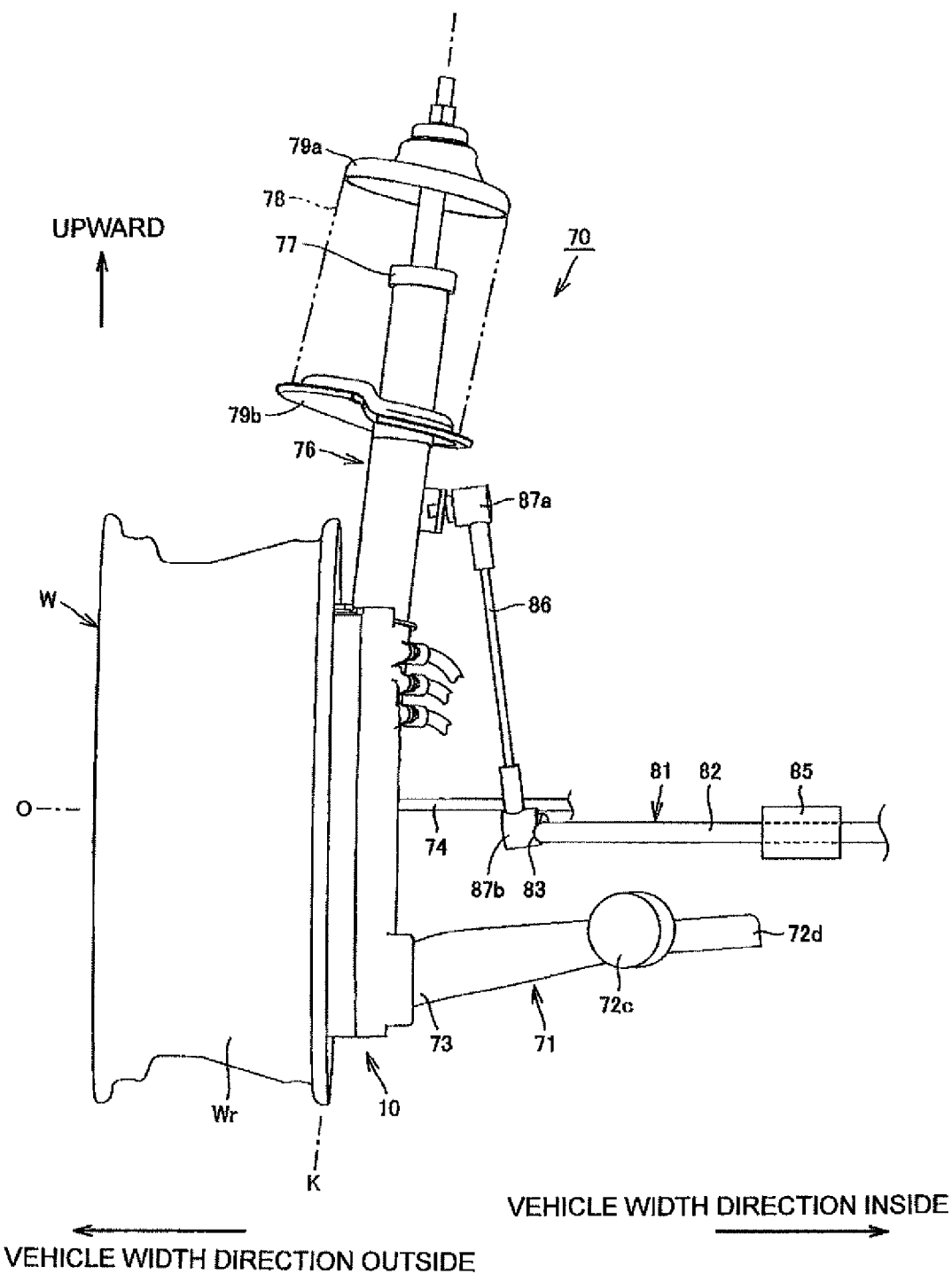
FIG. 5 is a side view showing the suspension structure of the same embodiment and showing a state viewed from a vehicle front.
Figure 6:
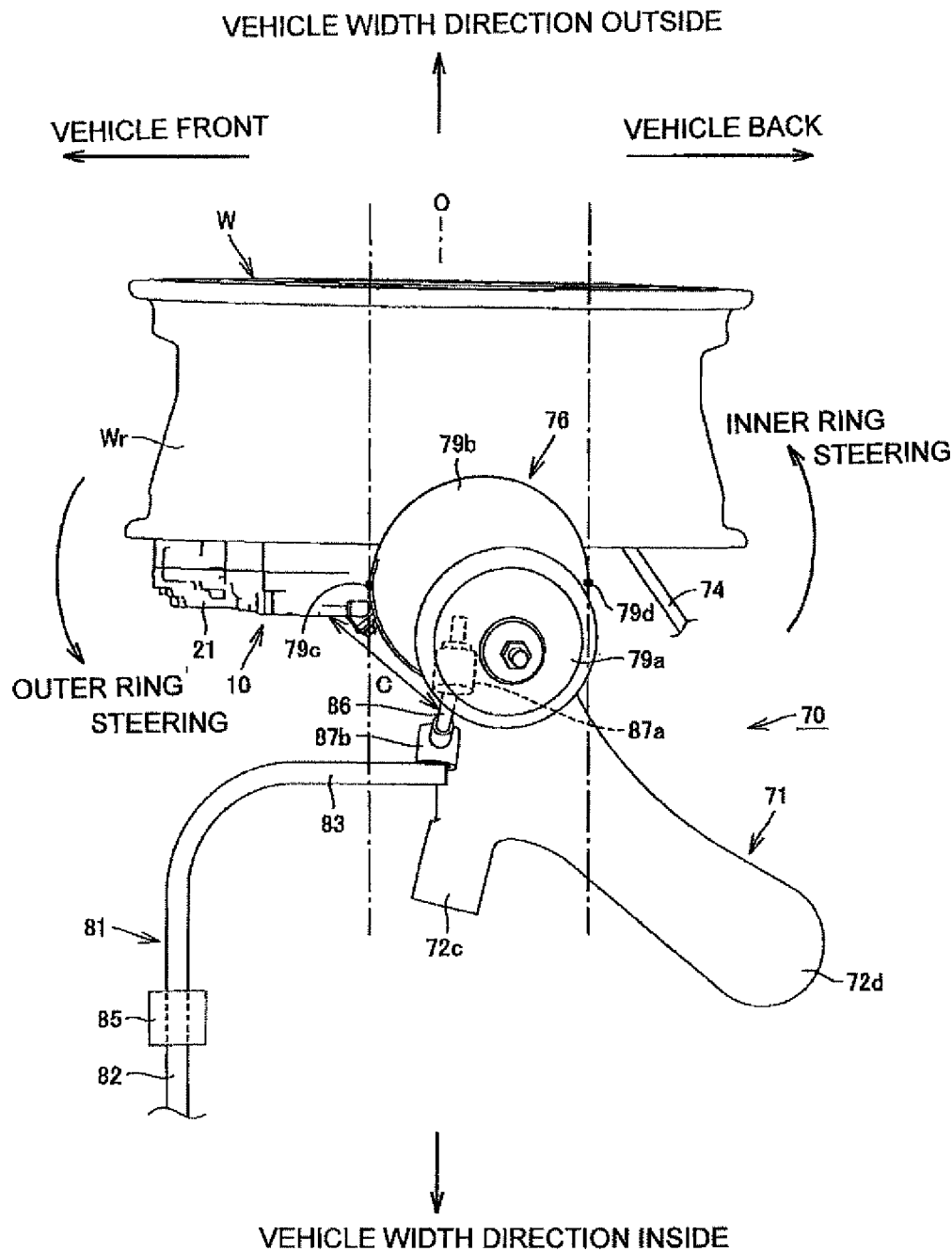
FIG. 6 is a plan view showing the suspension structure of the same embodiment.

FIG. 4 is a rear view showing the suspension structure of the same embodiment and showing a state viewed from a vehicle width direction inside. FIG. 5 is a side view showing the suspension structure of the same embodiment and showing a state viewed from a front of the vehicle. FIG. 6 is a plan view showing the suspension structure of the same embodiment and showing a state viewed from above. A suspension device 70 of the present embodiment is a strut type suspension device and is arranged on the both vehicle width direction sides so as to be bilaterally symmetrical. Further, the suspension device 70 includes a stabilizer mechanism extending from the vehicle width direction left side to right side. The pair of right and left suspension devices 70 and 70 are joined via the stabilizer mechanism.

In FIG. 4, a brake caliper 89 is attached to the in-wheel motor drive device 10. The brake caliper 89 clamps the brake disc BD coupled with the outer ring 12 to put a brake on the outer ring. In order to facilitate the understanding of the invention, in FIG. 6, the hat circle BH hidden behind the in-wheel motor drive device 10 is indicated by a broken line.

The suspension device 70 has a lower arm 71, a strut 76, a torsion bar 81, and a stabilizer link 86. The strut 76 includes a shock absorber that is a combination of a damper 77 and a coil spring 78, and is a suspension member that extends in a vertically expandable manner. In an upper end region of the strut 76, a flange-shaped upper spring seat 79*a* is attached and fixed. In a lower end region of the strut 76, a lower spring seat 79*b* is attached and fixed. The upper spring seat 79*a* and the lower spring seat 79*b* are spaced apart in the vertical direction, and the coil spring 78 is compressed and provided between these spring seats. When the space between the upper spring seat 79*a* and the lower spring seat 79*b* changes due to expansion and contraction of the strut 76, the coil spring 78 expands and contracts together with the damper 77. The upper end of the strut 76 is joined with a vehicle body side member (not illustrated), for example, a vehicle body frame. The lower end of the strut 76 is attached and fixed to the upper portion of the in-wheel motor drive device 10.

The lower arm 71 is a suspension member that is arranged further downward than the strut 76 and extends in the vehicle width direction. The lower arm 71 is Y-shaped or V-shaped, and has two vehicle width direction inside ends 72*c* and 72*d* branching on the vehicle width direction inside. The vehicle width direction inside ends 72*c* and 72*d* are rotatably joined with a vehicle body side member not illustrated, for example, a vehicle body subframe, via a pivot extending in the vehicle front/back direction. A vehicle width direction outside end 73 (FIG. 4) of the lower arm 71 is arranged in the inner space region of the road wheel W and is rotatably joined with the in-wheel motor drive device 10. Specifically, the vehicle width direction outside end 73 is joined with the lower portion of the hub carrier 18 (FIG. 3) via a ball joint which can freely change its direction. As a result, the lower arm 71 can swing in the vertical direction with the vehicle width direction inside ends 72*c* and 72*d* as base ends and the vehicle width direction outside end 73 as a free end.

A straight line connecting the upper end of the strut 76 and the vehicle width direction outside end 73 including the ball joint constitutes a steering axis K. The in-wheel motor drive device 10 and the road wheel W can be steered around the steering axis K as a center. A vehicle back side portion of the in-wheel motor drive device 10 is joined with a tie rod 74. As the tie rod 74 is displaced in the vehicle width direction, the in-wheel motor drive device 10 and the road wheel W are steered.

The torsion bar 81 is arranged in the vehicle front that becomes opposite to the tie rod 74 as viewed from the axis O. The torsion bar 81 includes a twisted portion 82 extending from a vehicle width direction center portion of the vehicle body to the both vehicle width direction outsides that are not illustrated and an arm portion 83 further extending in a different direction from the vehicle width direction outside end of the twisted portion 82 to the vehicle back.

The twisted portion 82 extends straight in the vehicle width direction and is passed through a sleeve 85 at one end side and the other end side. The sleeve 85 is attached to a bottom surface of the vehicle body (not illustrated), whereby the twisted portion 82 is supported by the vehicle body. The torsion bar 81 extends in a substantially horizontal direction as shown in FIG. 4 in a normal state where the load loaded on the vehicle body is a predetermined standard value, the in-wheel motor drive device 10 and the road wheel W do not bound or rebound in the vertical direction, and the stroke amounts of the struts 76 on the both vehicle width direction right and left sides are equal.

The stabilizer link 86 is provided to each of the suspension devices 70 arranged on the both vehicle width direction right and left sides. The stabilizer link 86 vertically extends. An upper end 87*a* of the stabilizer link 86 is joined with the lower end region of the strut 76 via the ball joint and a lower end 87*b* of the stabilizer link 86 is joined with the back end of the arm portion 83 via the ball joint. Ball joints capable of being freely bent and deformed are provided at these joint points. As a result, when the stroke amount of the strut 76 changes and the in-wheel motor drive device 10 bounds and rebounds, the angle between the stabilizer link 86 and the strut 76 and the angle between the stabilizer link 86 and the arm portion 83 change.

More specifically, when the in-wheel motor drive device 10 on the vehicle width direction right side shown in FIG. 4 to FIG. 6 bounds upward from the normal state in the drawing, a back end of the arm portion 83 is displaced further upward than the twisted portion 82 and twist is applied to the twisted portion 82. Then, a restoring force against the twist is returned to the in-wheel motor drive device 10 from the torsion bar 81, and the upward bound is suppressed. Conversely, also when the in-wheel motor drive device 10 rebounds downward from the normal state, the downward rebound is suppressed for the same reason. Also, the torsion bar 81 exhibits the same effect on the road wheel on the vehicle width direction left side (not illustrated).

According to the present embodiment, the torsion bar 81 and the stabilizer link 86 as a stabilizer mechanism improve the roll rigidity in an electric vehicle including the in-wheel motor drive device 10.

As shown in FIG. 4, the upper end 87*a* of the stabilizer link 86 is located further downward than the lower spring seat 79*b*, further forward of the vehicle than a vehicle back edge 79*d* of the lower spring seat 79*b*, and further backward of the vehicle than a vehicle front edge 79*c* of the lower spring seat 79*b*, and is joined to the side surface of the strut 76 on the vehicle width direction inside. In FIG. 4, the flange portion 12*f* of the outer ring 12, which is hidden by the in-wheel motor drive device 10 itself and can not be seen, is indicated by a broken line. As shown in FIG. 4, when viewed in the axis O direction, the lower end 87*b* of the stabilizer link 86 is arranged so as to overlap with the outer ring 12 that is a hub wheel. As a result, it is possible to arrange the stabilizer link on the vehicle width direction inside rather than arranging the stabilizer link 86 in the vehicle front/back direction as viewed from the strut 76. Accordingly, it is possible to arrange the stabilizer link 86 as close to the steering axis K as possible. Further, as indicated by arrows in FIG. 6, a clearance C between the motor portion 21 and the stabilizer link 86 is increased.

Therefore, according to the present embodiment, even if the in-wheel motor drive device 10 and the road wheel W are steered around the steering axis, interference with the stabilizer link 86 is eliminated. According to the present embodiment, it is possible to increase the maximum steering angle and decrease the turning radius of the electric vehicle in comparison with the conventional suspension structure for the in-wheel motor drive device.

Including the upper end 87*a* and the lower end 87*b*, the stabilizer link 86 is arranged so as to overlap with the strut 76 as viewed in the axis O direction as shown in FIG. 4. That is, as shown in FIG. 5, it is arranged on the more vehicle width direction inside than the strut 76 and the in-wheel motor drive device 10. Accordingly, even if the in-wheel motor drive device 10 and the road wheel W are steered around the steering axis as indicated by the arrows in FIG. 6, there is no possibility of interference with the stabilizer link 86, and the maximum steering angle can be further increased and the turning radius of the electric vehicle can be further decreased in comparison with the conventional in-wheel motor drive device.

In addition, as shown in FIG. 4, the stabilizer link 86 is arranged so as to overlap with the outer ring 12 that is a hub wheel when viewed in the axis O direction. It is thus possible to realize the arrangement of the stabilizer mechanism that has not been able to be achieved by an engine vehicle having the conventional drive shaft and the constant velocity joint.

Figure 7:
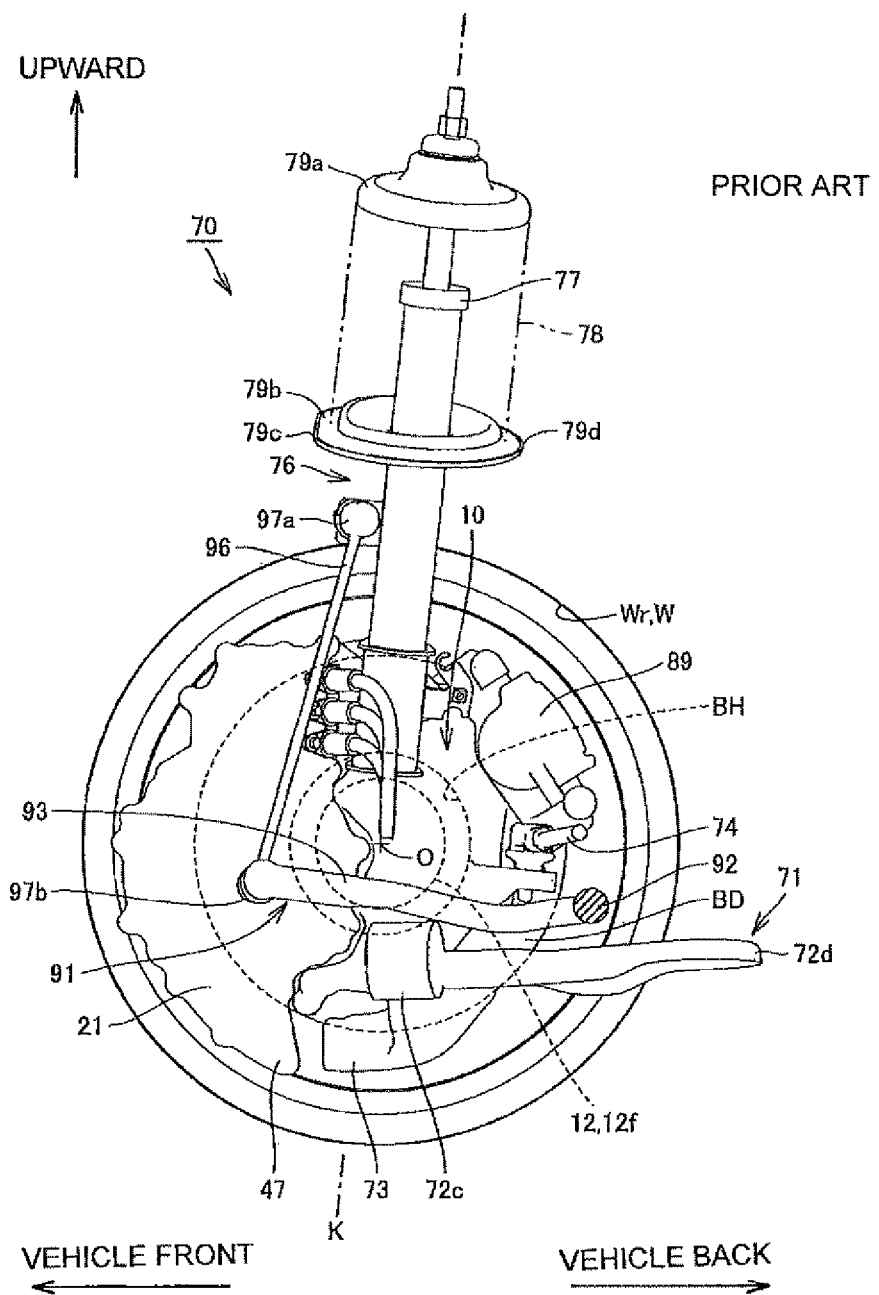
FIG. 7 is a rear view showing the suspension structure of a comparative example and showing a state viewed from a vehicle width direction inside.
Figure 8:
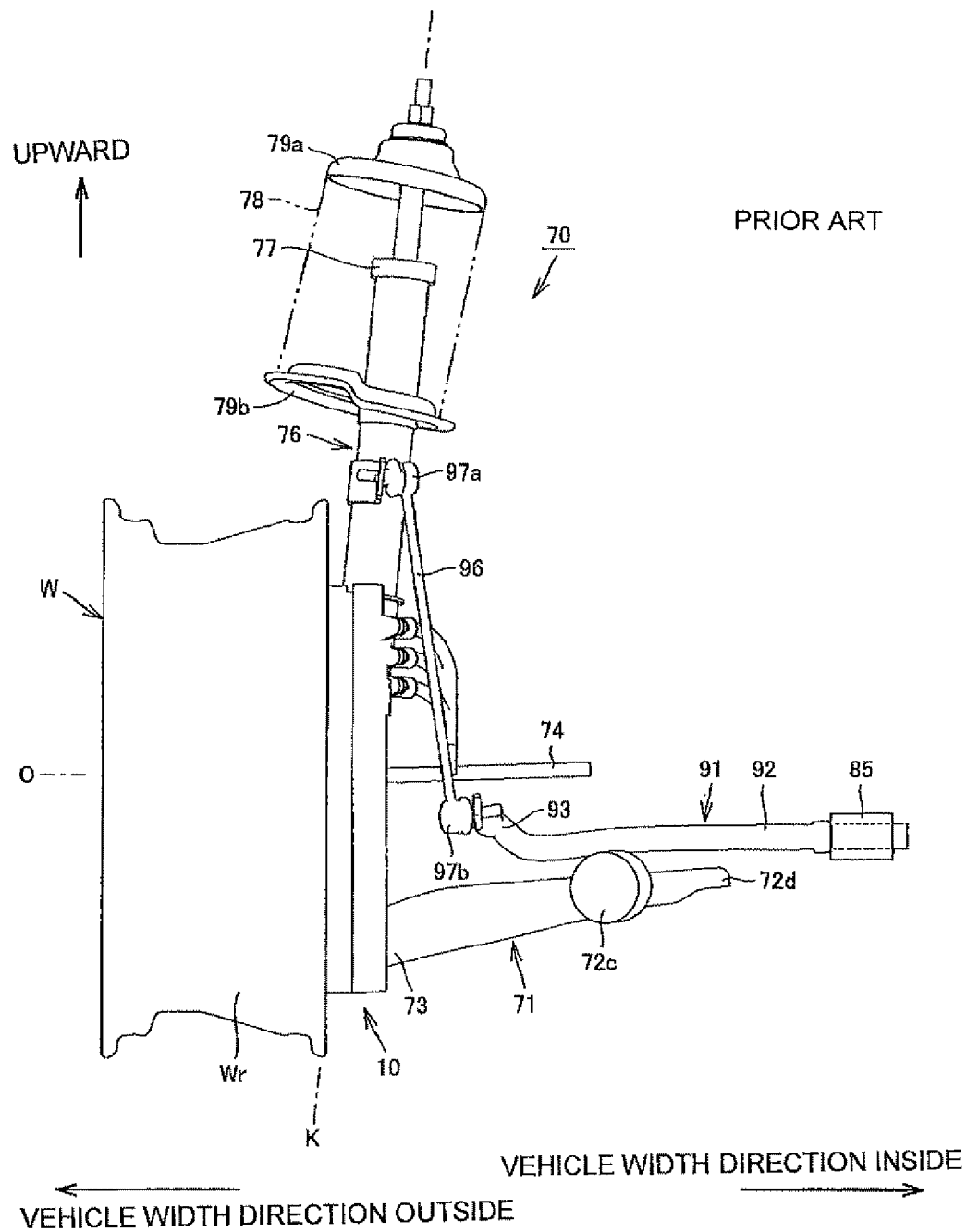
FIG. 8 is a side view showing the suspension structure of the comparative example and showing a state viewed from a vehicle front.
Figure 9:
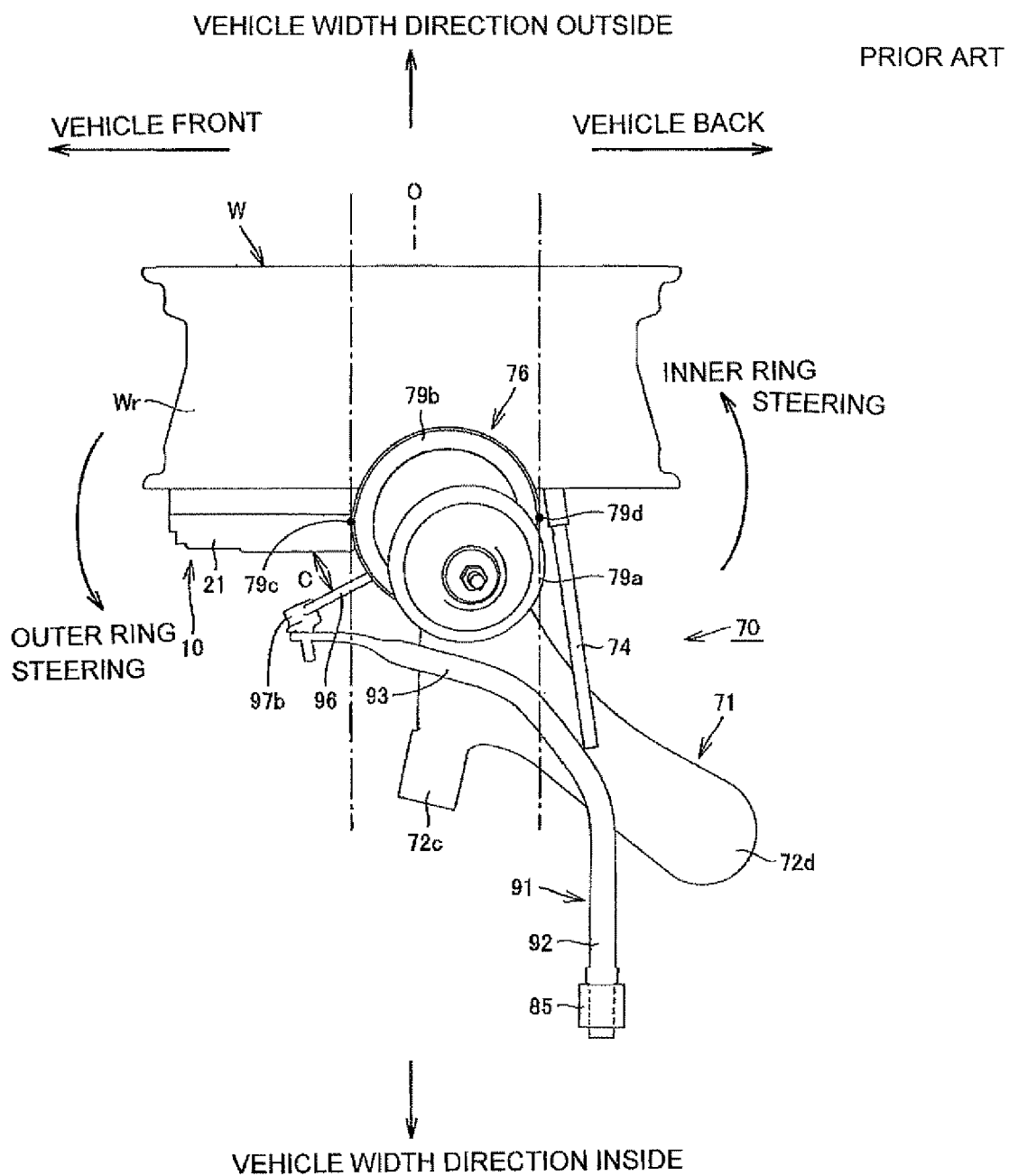
FIG. 9 is a plan view showing the suspension structure of the comparative example.

To facilitate understanding of the present invention, the comparative example shown in FIG. 7 to FIG. 9 will be described. FIG. 7 is a rear view showing the suspension structure of a comparative example and showing a state viewed from the vehicle width direction inside. FIG. 8 is a side view showing the suspension structure of the comparative example and showing a state viewed from the vehicle front. FIG. 9 is a plan view showing the suspension structure of the comparative example, showing a state as viewed from above. In FIG. 7 to FIG. 9, parts common to those of the embodiment of the present invention described above are denoted by the same reference numerals and description thereof is omitted.

In the comparative example, although a twisted portion 92 of a torsion bar 91 extends to a vehicle width direction outside from the vehicle width direction center portion, it is arranged downward so that an arm portion 93 does not intersect with the axis O. As shown in FIG. 7, a stabilizer link 96 is arranged so as to overlap with the motor portion 21 of the in-wheel motor drive device 10 when viewed in the axis O direction. An upper end 97*a* of the stabilizer link 96 is arranged in the vehicle front of the strut 76 and is joined to the side surface of the vehicle front side of the strut 76. A lower end 97*b* of the stabilizer link 96 is arranged in the vehicle ahead of the outer ring 12. That is, the stabilizer link 96 is arranged to be separated from the strut 76 in the vehicle front.

In the comparative example, the clearance C between the motor portion 21 and the stabilizer link 96 is small as indicated by arrows in FIG. 9. For this reason, when the in-wheel motor drive device 10 is steered with a large steering angle, the motor portion 21 may interfere with the stabilizer link 96.

Returning to the description of the present embodiment, the twisted portion 82 of the torsion bar 81 is arranged in the vehicle ahead of the axis O as shown in FIG. 4. According to the Ackermann steering geometry, it is necessary to reduce the steering angle of the wheel of the turning outer wheel to less than the turning inner wheel in a maximum steered state. That is, arranging the stabilizer in a front space of the wheel house of the turning outer wheel having a small steering angle at the time of maximum steering is advantageous for avoiding interference between the arm portion 83 and the in-wheel motor drive device 10. Hence, as in the present embodiment, it is advantageous to arrange the torsion bar 81 on the more front side of the vehicle than the steering axis K and the axis O and to extend the arm portion 83 from the front toward the back of the vehicle.

Further, according to the present embodiment, as shown in FIG. 2, the input shaft 32 arranged offset from the axis O to the vehicle front is included. The motor rotation shaft 22 coaxially coupled with the input shaft 32 is also arranged offset from the axis O to the vehicle front. As shown in FIG. 3 and FIG. 6, the motor portion 21 protrudes to a vehicle width direction inside from the wheel hub bearing portion 11 and the speed reduction portion 31. According to the Ackermann steering geometry, it is necessary to reduce the steering angle of the wheel of the turning outer wheel to less than the turning inner wheel in a maximum steered state. That is, arranging the motor portion 21 in a front space of the wheel house of the turning outer wheel having a small steering angle at the time of maximum steering is advantageous for avoiding the above-described interference. Hence, as in the present embodiment, it is advantageous to arrange the motor portion 21 on the more front side of the vehicle than the steering axis K and the axis O.

Further, according to the present embodiment, the strut 76 extends and retracts in the vertical direction as a shock absorber, and the lower arm 71 is further included such that it is arranged further downward than the strut 76, extends in the vehicle width direction, and of which the vehicle width direction outside end 73 is rotatably joined with the in-wheel motor drive device 10 and the vehicle width direction inside ends 72c and 72d are rotatably joined to a vehicle body side member not illustrated. Hence, in the strut type suspension device, while ensuring the roll rigidity, the maximum steering angle of the in-wheel motor drive device 10 can be increased.

Further, according to the present embodiment, the in-wheel motor drive device 10, the strut 76, and the stabilizer link 86 are arranged on the both vehicle width direction right and left sides so as to be bilaterally symmetrical on the both vehicle width direction right and left sides and form pairs, and the torsion bar 81 extends to the both vehicle width direction outsides from the vehicle width direction center portion, is joined with the stabilizer link 86 on the vehicle width direction left side at one end, and is joined with the stabilizer link 86 on the vehicle width direction right side at the other end. As a result, uneven strokes of the pair of right and left suspension devices are suppressed by one torsion bar 81, and it is possible to increase the maximum steering angle of the in-wheel motor drive device 10, while securing the roll rigidity of the electric vehicle.

Although the embodiment of the present invention has been described with reference to the drawings, the present invention is not limited to the embodiment shown in the drawings. Various modifications and variations can be made to the illustrated embodiment within the identical scope to the present invention or within an equivalent scope.

As an example of variation not illustrated, for example, the lower end 87b may be arranged in the hat circle BH as viewed in the axis O direction as shown in FIG. 6. Alternatively, as an example of variation not illustrated, for example, the torsion bar 81 is arranged in the vehicle back as viewed from the axis O. Alternatively, as an example of variation not illustrated, for example, the upper end 87a of the stabilizer link 86 is joined with the in-wheel motor drive device 10.

INDUSTRIAL APPLICABILITY

The suspension structure for an in-wheel motor drive device according to the present invention is advantageously used in electric vehicles and hybrid vehicles.

REFERENCE SIGNS LIST

10 in-wheel motor drive device
11 wheel hub bearing portion
12 outer ring (hub wheel)
12f flange portion
13 inner fixing member
14 rolling element
15 fixed axis
18 hub carrier
21 motor portion
22 motor rotation axis
23 rotor
24 stator
25 motor casing
25v motor casing cover
31 speed reduction portion
32 input shaft
33 input gear
34, 36, 37, 39 intermediate gear
35, 38 intermediate shaft
40 output gear
41 output shaft
43 body casing
43b back surface portion
43c portion immediately below
43f front surface portion
47 oil tank
70 suspension device
71 lower arm
72c, 72d vehicle width direction inside end
73 vehicle width direction outside end
74 tie rod
76 strut
77 damper
78 coil spring
79a upper spring seat
79b lower spring seat
79c vehicle front edge
79d vehicle back edge
81 torsion bar
82 twisted portion
83 arm portion
85 sleeve
86 stabilizer link
87a upper end
87b lower end
89 brake caliper
BD brake disc
BH hat circle
C clearance
K steering axis
M, Nf, Nl, O, P axis
W road wheel
Wr rim portion
Ws spoke portion.

The invention claimed is:

1. A suspension structure for an in-wheel motor drive device, comprising:
an in-wheel motor drive device having a hub wheel coupled with a wheel and a motor portion for driving the hub wheel;
a vertically extendable shock absorber of which an upper end is joined with a vehicle body side member and a lower end is joined with the in-wheel motor drive device;
a torsion bar including a twisted portion extending to a vehicle width direction outside from a vehicle width direction center portion and an arm portion further extending in a different direction from a vehicle width direction outside end of the twisted portion to a vehicle front/back direction; and
a vertically extending stabilizer link of which an upper end is joined with a lower end region of the shock absorber or the in-wheel motor drive device and a lower end is joined with the arm portion, wherein
the shock absorber includes an upper spring seat provided in an upper end region of the shock absorber and a lower spring seat provided in the lower end region of the shock absorber and forming a pair with the upper spring seat,
the upper end of the stabilizer link is arranged between a vehicle back edge and a vehicle front edge of the lower spring seat, and
the lower end of the stabilizer link is arranged so as to overlap with the hub wheel as viewed in an axial direction of the hub wheel, wherein the twisted portion is arranged in a vehicle ahead of an axis of the hub wheel, and wherein the in-wheel motor drive device includes a motor rotation shaft arranged offset from an axis of the hub wheel towards a vehicle front.

2. The suspension structure for an in-wheel motor drive device according to claim 1, wherein the shock absorber is a strut, further comprising a lower arm that is arranged further downward than the strut, extends in a vehicle width direction, and of which a vehicle width direction outside end is rotatably joined with the in-wheel motor drive device and a vehicle width direction inside end is rotatably joined to a vehicle body side member.

3. The suspension structure for an in-wheel motor drive device according to claim 1, wherein
- the in-wheel motor drive device, the shock absorber, and the stabilizer link are arranged on both vehicle width direction sides and form pairs, respectively, and
- the torsion bar is joined with the stabilizer link on a vehicle width direction left side at one end and joined with the stabilizer link on a vehicle width direction right side at an other end.

* * * * *